(12) United States Patent
Yamashita

(10) Patent No.: US 8,750,386 B2
(45) Date of Patent: Jun. 10, 2014

(54) CONTENT REPRODUCTION DEVICE

(75) Inventor: Akihiko Yamashita, Kobe (JP)

(73) Assignee: SANYO Electric Co., Ltd., Moriguchi-shi, Osaka (JP)

(*) Notice: Subject to any disclaimer, the term of this patent is extended or adjusted under 35 U.S.C. 154(b) by 834 days.

(21) Appl. No.: 12/904,455

(22) Filed: Oct. 14, 2010

(65) Prior Publication Data

US 2011/0085077 A1 Apr. 14, 2011

(30) Foreign Application Priority Data

Oct. 14, 2009 (JP) ................................. 2009-237071

(51) Int. Cl.
| H04N 7/12 | (2006.01) |
| H04N 11/02 | (2006.01) |
| H04N 11/04 | (2006.01) |
| H04B 1/66 | (2006.01) |
| H04N 21/44 | (2011.01) |
| H04N 21/462 | (2011.01) |

(52) U.S. Cl.
CPC ..... H04N 21/44008 (2013.01); H04N 21/4622 (2013.01)
USPC ................................... 375/240.25

(58) Field of Classification Search
None
See application file for complete search history.

(56) References Cited

U.S. PATENT DOCUMENTS

| 5,903,264 | A | * | 5/1999 | Moeller et al. | ................. 715/719 |
| 8,181,206 | B2 | * | 5/2012 | Hasek | .............. 725/58 |
| 8,429,365 | B2 | * | 4/2013 | Lin et al. | ........................ 711/164 |
| 2008/0281677 | A1 | * | 11/2008 | Toms et al. | ..................... 705/10 |
| 2010/0332723 | A1 | * | 12/2010 | Lin et al. | ........................ 711/100 |
| 2011/0188439 | A1 | * | 8/2011 | Mao et al. | ..................... 370/312 |

FOREIGN PATENT DOCUMENTS

| JP | 2002-507344 A | 3/2002 |
| JP | 2002-538735 A | 11/2002 |
| JP | 2007-189554 A | 7/2007 |
| JP | 2009-071668 A | 4/2009 |
| WO | 98/56188 A2 | 12/1998 |
| WO | 00/52927 A1 | 9/2000 |

* cited by examiner

*Primary Examiner* — Nhon Diep
(74) *Attorney, Agent, or Firm* — Westerman, Hattori, Daniels & Adrian, LLP

(57) ABSTRACT

A content reproduction device has a television broadcast reception function and an Internet connection function, and includes a detection unit and a reproduction-output switching unit. The detection unit detects, when a content of a television broadcast is output for reproduction, a content which is the same as the content of the television broadcast and has a resolution higher than a resolution of the content of the television broadcast from among contents available via an Internet. The reproduction-output switching unit switches a content of the output for reproduction from the content of the television broadcast to the content detected by the detection unit if the detection by the detection unit is successful.

7 Claims, 3 Drawing Sheets

US 8,750,386 B2

CONTENT REPRODUCTION DEVICE

This nonprovisional application claims priority under 35 U.S.C. §119(a) on Patent Application No. 2009-237071 filed in Japan on Oct. 14, 2009, the entire contents of which are hereby incorporated by reference.

BACKGROUND OF THE INVENTION

1. Field of the Invention

The present invention relates to a content reproduction device having a television broadcast reception function and an Internet connection function, and capable of reproducing a content from television broadcast and the Internet.

2. Description of Related Art

The television broadcast has been making transition from analog broadcast to digital broadcast utilizing the moving picture experts group (MPEG 2) compression, and television receivers which can be connected to the Internet and allow a user to view contents both from the Internet and from broadcast (hereinafter, referred to as IPTV) have been developed.

The simplest configuration of the IPTV independently handles respective contents from different media. For this configuration, it is preferred that the input mode be switched between a broadcast signal reception mode and an Internet reception mode, and, in each of the modes, only contents available in media corresponding to the mode be selectable, for example.

On the other hand, in terms of user's convenience of operability, a configuration of integrating contents from different media is preferred to the configuration of independently handling respective contents from different media. Various IPTVs integrating and handling contents from different media have conventionally been proposed. For example, a system for selectively displaying an Internet content and a television program on a screen, in which web pages are displayed on a graphical user interface in a format similar to the channels of the conventional television broadcast, has been proposed. Moreover, an information display device for seamlessly displaying digital satellite service (DSS) programs, web pages, and local (terrestrial) broadcast channels has been proposed.

As a result of the recent growth in population of the broadband, contents in the high definition (HD) image quality on the Internet become available for viewing, and there may occur a situation in which the same content as that of the television broadcast can be viewed on the Internet with higher image quality. In other words, there may occur a situation in which while a movie broadcast as one program of the television broadcast is in standard definition (SD) image quality of 480 vertical pixels, the same movie available via the Internet is in HD image quality of 720 or 1,080 vertical pixels.

Even if the conventional IPTV is configured so that contents integrated from different media are handled and television broadcast channels and Internet channels in a channel list can be seamlessly selected, a search operation such as channel surfing is necessary for determining whether the same content exists both in a television broadcast channel and in an Internet channel. As a result, if a user neglects such a search operation, the user may view a content from the television broadcast without knowing that the same content is available in higher image quality on the Internet.

SUMMARY OF THE INVENTION

It is therefore an object of the present invention to provide a content reproduction device which can prevent a user from viewing a content of a television broadcast without knowing that the same content is available in higher image quality on the Internet.

In order to achieve the above-mentioned object, a content reproduction device according to the present invention has a television broadcast reception function and an Internet connection function, and includes a detection unit and a reproduction-output switching unit. The detection unit detects, when a content of a television broadcast is output for reproduction, a content which is the same as the content of the television broadcast and has a resolution higher than a resolution of the content of the television broadcast from among contents available via an Internet. The reproduction-output switching unit switches a content of the output for reproduction from the content of the television broadcast to the content detected by the detection unit if the detection by the detection unit is successful.

Further, in order to achieve the above-mentioned object, another content reproduction device according to the present invention has a television broadcast reception function and an Internet connection function, and includes a detection unit and a scheduling switching unit. The detection unit detects, when a user selects a program of a television broadcast for one of scheduled recording and scheduled viewing in EPG, a content which is the same as a content of the television broadcast and has a resolution higher than a resolution of the content of the television broadcast from among contents available via an Internet. The scheduling switching unit switches a content of the one of the scheduled recording and the scheduled viewing from the content of the television broadcast to the content detected by the detection unit if the detection by the detection unit is successful.

Though the two content reproduction devices mentioned above may separately be embodied, they may be embodied in combination as well.

DETAILED DESCRIPTION OF PREFERRED EMBODIMENTS

Figure 1:
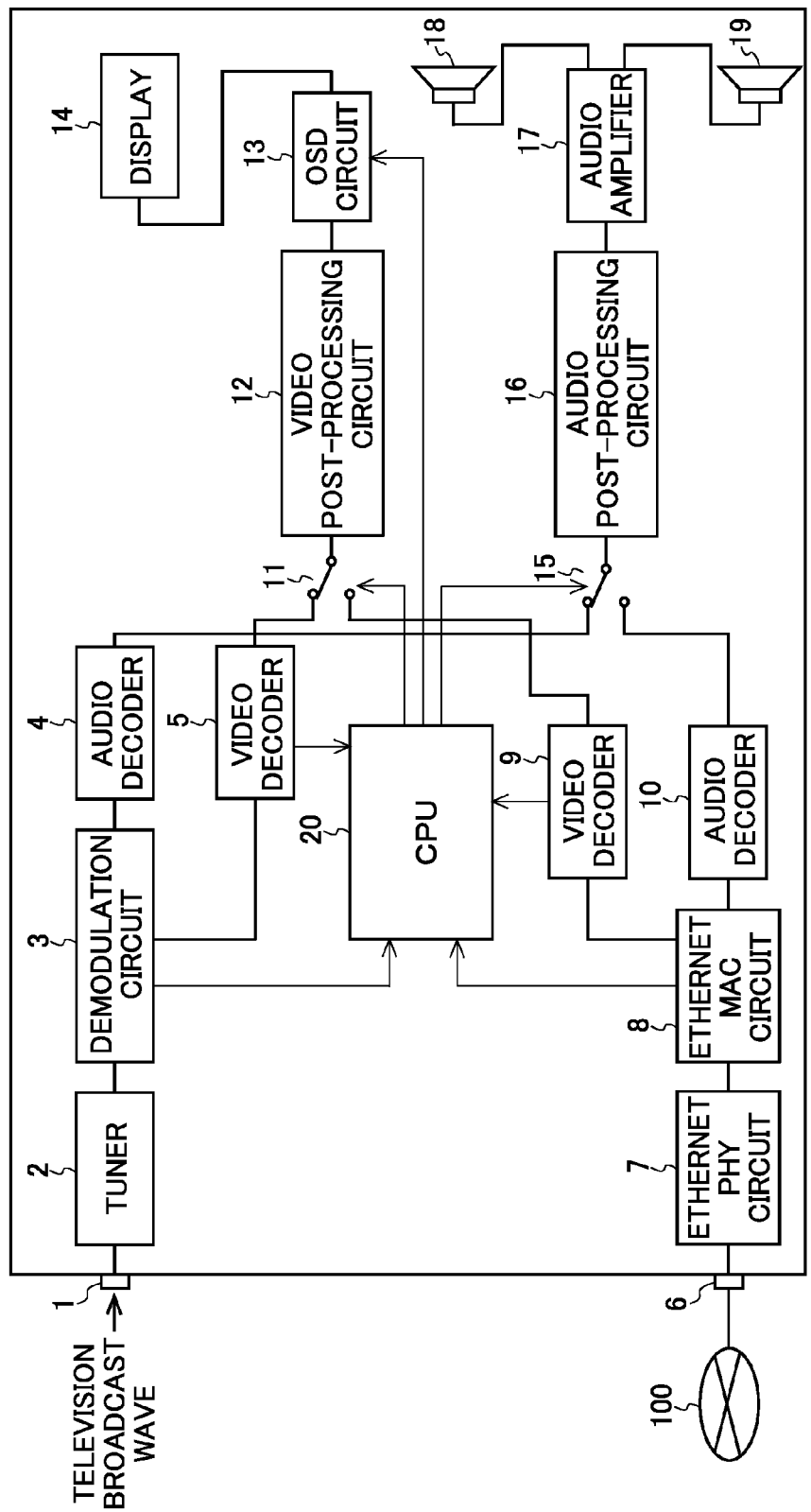
FIG. 1 is a block diagram schematically illustrating a configuration example of an IPTV according to an embodiment of the present invention.

A description is now given of embodiments of the present invention referring to drawings. The description herein is given of an IPTV as an example of a content reproduction device according to the present invention. FIG. 1 schematically illustrates a configuration example of the IPTV according to an embodiment of the present invention.

The IPTV according to the embodiment of the present invention illustrated in FIG. 1 is an IPTV of a North American specification, and includes a television broadcast signal input terminal 1, a tuner 2, a demodulation circuit 3, an audio decoder 4, a video decoder 5, an Ethernet input terminal 6, an Ethernet PHY circuit 7, an Ethernet MAC circuit 8, a video decoder 9, an audio decoder 10, a switch 11, a video post-processing circuit 12, an OSD circuit 13, a display 14, a switch 15, an audio post-processing circuit 16, an audio amplifier 17, speakers 18 and 19, and a CPU 20. The IPTV according to the embodiment of the present invention illustrated in FIG. 1 includes a remote control signal reception circuit (not shown) for receiving a remote control signal transmitted from a remote control transmitter (not shown), converting the remote control signal into a control signal, and providing the CPU 20 with the control signal in addition to the components mentioned above.

The television broadcast signal input terminal 1 receives inputs of television broadcast signal, a terrestrial television broadcast or a cable television broadcast, and feeds television broadcast signal to the tuner 2. The television broadcast signal input to the television broadcast signal input terminal 1 includes those of analog channels and digital channels. The tuner 2 down-converts a television broadcast signal of a selected channel in the RF signal format into an IF signal at a specific frequency. The demodulation circuit 3 demodulates the IF signal received from the tuner 2, separates the demodulated signal into a video signal and an audio signal, and outputs the video signal and the audio signal.

The audio decoder 4 applies decode processing to the audio signal received from the demodulation circuit 3, and outputs audio signals in the baseband. Respective contents of the decode processing for the analog broadcast and the digital broadcast are different from each other, and hence the audio decoder 4 includes both a decode circuit for the analog broadcast and a decode circuit for the digital broadcast. Specifically, the audio decoder 4 outputs the audio signal received from the demodulation circuit 3 as stereo audio signals for the analog broadcast, and decodes a Dolby Digital signal, and then outputs stereo audio signals for the digital broadcast.

The video decoder 5 applies decode processing to the video signal received from the demodulation circuit 3, and outputs video signals which have undergone the decode processing. Respective contents of the decode processing for the analog broadcast and the digital broadcast are different from each other, and hence the video decoder 5 includes both a decode circuit for the analog broadcast and a decode circuit for the digital broadcast as in the case of the audio decoder 4. Specifically, the video decoder 5 outputs a luminance (Y) signal and a chroma (C) signal separated by applying the decode processing to the NTSC signal for the analog broadcast, and applies the decode processing to the MPEG2 signal, and then outputs a Y signal and a C signal for the digital broadcast.

The Ethernet input terminal 6 is a terminal used for connection with the Internet 100, and receives an input of a content available via the Internet 100. The content input to the Ethernet input terminal 6 passes through the Ethernet PHY circuit 7 used for processing the physical layer of the Ethernet, is processed by the Ethernet MAC circuit 8 for processing the MAC layer of the Ethernet, and is separated into a compressed video signal and a compressed audio signal.

The video decoder 9 is a circuit used for applying decode processing to the compressed video signal received from the Ethernet MAC circuit 8, and then outputting a Y signal and a C signal, and thus carries out decode processing according to a video compression format (such as H.264).

The audio decoder 10 is a circuit used for applying decode processing to the compressed audio signal received from the Ethernet MAC circuit 8, and then outputting stereo audio signals, and thus carries out decode processing according to an audio compression format (such as MP3).

The switch 11 alternatively selects the video signals (Y signal and C signal) output from the video decoder 5 and the video signals (Y signal and C signal) output from the video decoder 9, and outputs the selected video signals to the video post-processing circuit 12. The video post-processing circuit 12 carries out processing such as image quality adjustment and scaling on the video signals obtained from the switch 11. The OSD circuit 13 overlays an OSD signal on the video signals received from the video post-processing circuit 12 if necessary, and outputs the OSD-overlaid signals to the display 14. The display 14 displays an image based on the signals received from the OSD circuit 13.

The switch 15 alternatively selects the audio signals (stereo audio signals) output from the audio decoder 4 and the audio signals (stereo audio signals) output from the audio decoder 10, and outputs the selected audio signals to the audio post-processing circuit 16. The audio post-processing circuit 16 carries out sound quality adjustment and volume adjustment on the audio signals obtained from the switch 15. The audio amplifier 17 amplifies the audio signals received from the audio post-processing circuit 16, and outputs the amplified signals. The speaker 18 converts a left audio signal received from the audio amplifier 17 into a sound, and the speaker 19 converts a right audio signal received from the audio amplifier 17 into a sound.

Switching the two switches 11 and 15 synchronously enables a switch between the viewing of a content from the television broadcast and the viewing of a content from the Internet. In other words, when the switch 11 selects the video signal output from the video decoder 5, and the switch 15 selects the audio signal output from the audio decoder 4, the content from the television broadcast is to be viewed, and when the switch 11 selects the video signal output from the video decoder 9, and the switch 15 selects the audio signal output from the audio decoder 10, the content from the Internet is to be viewed.

The CPU 20 carries out software control for the entire IPTV according to the embodiment of the present invention illustrated in FIG. 1. In particular, the CPU 20 obtains information on the content from the demodulation circuit 3, the video decoder 5, the Ethernet MAC circuit 8, and the video decoder 9, detects whether the same contents exist in the television broadcast and the Internet 100, checks the respective video resolutions thereof if the same contents exist both in the television broadcast and in the Internet 100, and displays a notification message using the OSD circuit 13 when the same content as that of the television broadcast presently being viewed by the user and having a higher resolution exists on the Internet 100 as an operation relating to the feature of the present invention.

A description is now given of a method of detecting whether the same contents exist both in the television broadcast and in the Internet 100. On this occasion, it is assumed that the television broadcast is a real-time base, and contents present on the Internet 100 are an on-demand base.

The IPTV according to the embodiment of the present invention illustrated in FIG. 1 searches contents available via the Internet 100 for the same content as a content of a program of the television broadcast which is being viewed by the user, and if a content from the Internet 100 has a higher resolution than that of the program of the television broadcast, and the user selects to switch between the two switches 11 and 15, makes access to the content from the Internet 100 to reproduce the content as a streaming. An opposite case, namely, a case in which a program of the television broadcast with the same content as that from the Internet 100 which is being viewed by the user is detected in a proper timing, rarely occurs. Therefore, the IPTV according to the embodiment of the present invention illustrated in FIG. 1 does not search for a program of the television broadcast with the same content as that from the Internet 100 which is being viewed by the user.

The IPTV according to the embodiment of the present invention illustrated in FIG. 1 uses a program title when the IPTV searches the contents available via the Internet 100 for the same content as a content of a program of the television broadcast which is being viewed by the user. Moreover, the IPTV according to the embodiment of the present invention illustrated in FIG. 1 is a television set which can display an electronic program guide (EPG) provided by a cable television company or the like on the display 14 as an OSD, and a user selects a program of the television broadcast from the EPG displayed as an OSD on the display 14 for scheduled recording or scheduled viewing. The IPTV according to the embodiment of the present invention illustrated in FIG. 1 receives EPG data in which at least resolution information is contained in each of programs in the EPG, and searches contents available via the Internet 100 for the same content as that of a program selected by the user from the EPG. When the IPTV according to the embodiment of the present invention illustrated in FIG. 1 carries out this search, the IPTV uses program titles.

In a case of reception of the digital broadcast, table data (event information table (EIT)) containing program title information is multiplexed along with video data and audio data with a transport stream as specified by, for example, "ATSC Standard: Program and System Information Protocol for Terrestrial Broadcast and Cable (Revision C) with Amendment No. 1", which is a digital broadcast standard for the North America. In the IPTV according to the embodiment of the present invention illustrated in FIG. 1, the demodulation circuit 3 extracts the program title information from the table data contained in the generated transport stream, and transmits the program title information to the CPU 20.

In a case of reception of the analog broadcast, the program title information (Program Name specified by ANSI/CEA-608-E of ANSI/CEA Standard) is contained in the eXtended Data Service (XDS) data multiplexed with the vertical blanking interval. In the IPTV according to the embodiment of the present invention illustrated in FIG. 1, the video decoder 5 extracts the program title information from XDS data, and transmits the program title information to the CPU 20.

Each of the programs contained in the EPG also contains the program title information. In the IPTV according to the embodiment of the present invention illustrated in FIG. 1, the demodulation circuit 3 extracts from the EPG data the program title information of a program, which is selected by the user from the EPG, and transmits the program title information to the CPU 20.

For a content present on the Internet 100, metadata containing content title information is generally stored on a content server of a service provider. In the IPTV according to the embodiment of the present invention illustrated in FIG. 1, the metadata is passed from the Ethernet MAC circuit 8 to the CPU 20, and the CPU 20 searches for content title information corresponding to the program title information, thereby detecting whether the same content as that of a program of the digital broadcast which is being viewed by the user exists.

A description is now given of a method of detecting the resolution. Only the vertical pixel number is considered for the sake of simple description.

In the case of the digital broadcast, the digital standard for the North America employs the MPEG2 compression, and the Sequence_header contains the Horizontal_resolution (horizontal pixel number) and the Vertical_resolution (vertical pixel number) as described in the standard (ISO/IEC 13818-2), for example. In the IPTV according to the embodiment of the present invention illustrated in FIG. 1, the information on the vertical pixel number contained in the Sequence_header is transmitted from the video decoder 5 to the CPU 20, and the CPU 20 detects the vertical pixel number based on the transmitted information.

In the case of the analog broadcast, the vertical pixel number is fixed to 480 (480i: interlace type having a vertical line number of 480). In the IPTV according to the embodiment of the present invention illustrated in FIG. 1, the CPU 20 detects the vertical pixel number of the analog broadcast program by reading out the vertical pixel number of the analog broadcast program stored in advance in an internal memory.

The EPG data received by the IPTV according to the embodiment of the present invention illustrated in FIG. 1 is EPG data in which at least the resolution information is contained in each of the programs in the EPG as mentioned above. In the IPTV according to the embodiment of the present invention illustrated in FIG. 1, the demodulation circuit 3 extracts from the EPG data the resolution information of a program, which is selected by the user from the EPG, and transmits the resolution information to the CPU 20. As a result, the CPU 20 can detect the vertical pixel number of the program selected by the user from the EPG.

For contents present on the Internet 100, the information on the vertical pixel number may be contained in the metadata as in the case of the content title information, or may be known in advance. The case in which the vertical pixel number is known in advance includes a case in which all contents provided from a specific service provider have a common resolution. In the IPTV according to the embodiment of the present invention illustrated in FIG. 1, if the information on the vertical pixel number is contained in the metadata, the CPU 20 detects the vertical pixel number of a content obtained from the Internet 100 based on the metadata passed from the Ethernet MAC circuit 8, and if the vertical pixel number of a content obtained from the Internet 100 is known in advance, the CPU 20 reads out the vertical pixel number of the content obtained from the Internet 100 stored in the internal memory in advance, thereby detecting the vertical pixel number of the content obtained from the Internet 100.

Figure 2:
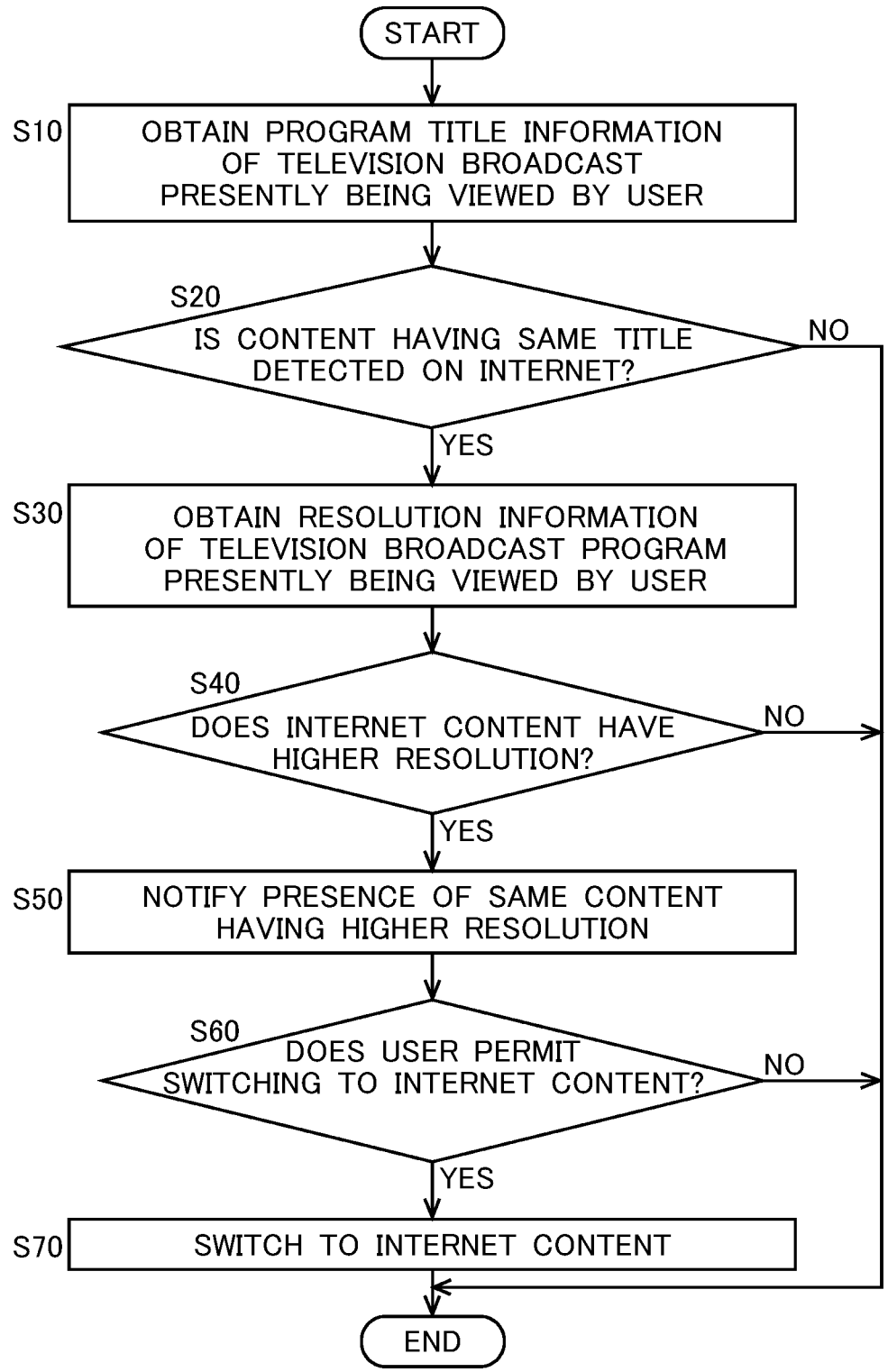
FIG. 2 is a flowchart illustrating a first embodiment of a control process implemented as software in a CPU provided to the IPTV illustrated in FIG. 1.

A description is now given of a first embodiment of a control process implemented as software in the CPU 20 referring to a flowchart illustrated in FIG. 2. When power of the IPTV according to the embodiment of the present invention illustrated in FIG. 1 is turned on, when a selected channel (channel being viewed) is changed on the tuner 2, when programs are switched on the same channel, or when the input mode is configured to have the broadcast signal reception mode and another mode and the input mode is switched from the another mode to the broadcast signal reception mode, the CPU 20 starts the processing of the flowchart illustrated in FIG. 2. The detection whether programs are switched on the same channel may be performed based on the EPG or the like.

When the processing of the flowchart illustrated in FIG. 2 starts, the CPU 20 first obtains the program title information of the program of the television broadcast which is presently being viewed by the user (Step S10). In Step S20 subsequent thereto, the CPU 20 searches contents available via the Internet 100 for the same content as the program of the television broadcast which is presently being viewed by the user.

As a result of the search, if the same content as the program of the television broadcast which is presently being viewed by the user is not detected ("NO" in Step S20), the CPU 20 finishes the processing of the flowchart illustrated in FIG. 2. On the other hand, if the same content as the program of the television broadcast which is presently being viewed by the user is detected as a result of the search ("YES" in Step S20), the CPU 20 proceeds to Step S30.

In Step S30, the CPU 20 obtains the resolution information of the program of the television broadcast, which is presently being viewed by the user. In Step S40 subsequent thereto, the CPU 20 obtains the resolution information on the content which is the same as the program of the television broadcast being viewed by the user, and is available via the Internet 100 (hereinafter, referred to as Internet content), and compares the resolution of the program of the television broadcast which is presently being viewed by the user, and the resolution of the Internet content.

As a result of the comparison, if the resolution of the program of the television broadcast which is presently being viewed by the user is equal to or higher than the resolution of the Internet content ("NO" in Step S40), the CPU 20 finishes the processing of the flowchart illustrated in FIG. 2. On the other hand, if the resolution of the Internet content is higher than the resolution of the program of the television broadcast which is presently being viewed by the user ("YES" in Step S40), the CPU 20 proceeds to Step S50.

In Step S50, the CPU 20 notifies the user, by means of the OSD display, of the fact that the same content having the higher resolution is present on the Internet 100. The OSD display is carried out by transmission of OSD display data from the CPU 20 to the OSD circuit 13. In Step S60 subsequent thereto, the CPU 20 determines whether the user permits switching from the viewing of the television program to the viewing of the Internet content by a key operation on the remote control transmitter (not shown) or the like.

If it is determined as a result that the user does not give permission within a predetermined period ("NO" in Step S60), the CPU 20 finishes the processing of the flowchart illustrated in FIG. 2. On the other hand, if it is determined as a result that the user gives permission ("YES" in Step S60), the CPU 20 switches the viewing of the television program to the viewing of the Internet content (Step S70), and finishes the processing of the flowchart illustrated in FIG. 2.

If a content available via the Internet 100 has a high resolution, the content is often not free, and hence some users do not want the switching from the viewing of the television program to the viewing of the Internet content. The processing in Steps S50 and S60 prevents the switching from the viewing of the television program to the viewing of the Internet content against the intention of the user.

Moreover, it is conceivable that a plurality of Internet contents are detected in Step S20. In this case, it is preferred that one Internet content be selected from the plurality of Internet contents in Step S60, and further, in terms of providing information for supporting determination upon the selection, service systems (charge information and the like) of the respective Internet contents be also notified in Step S50.

Figure 3:
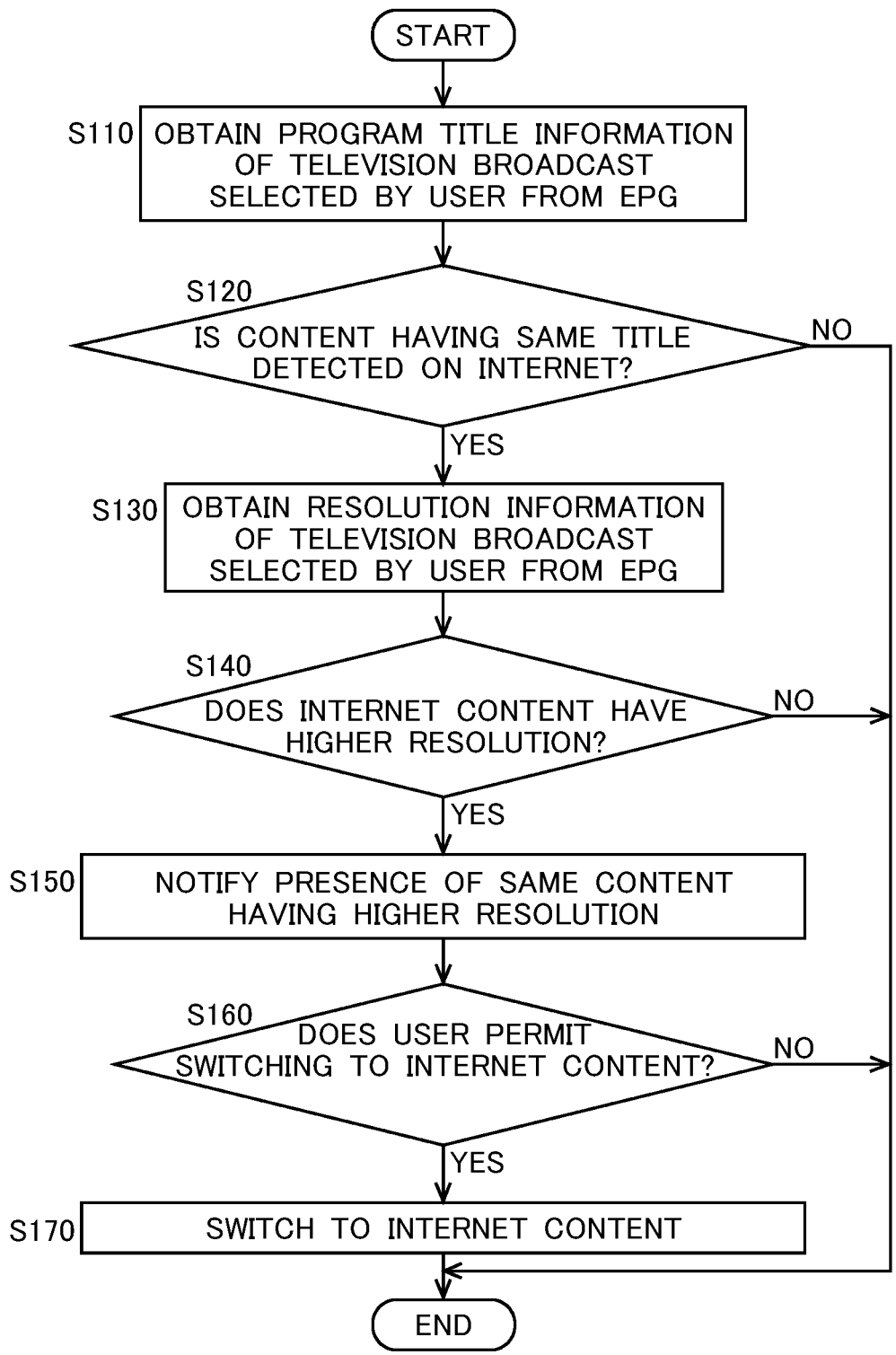
FIG. 3 is a flowchart illustrating a second embodiment of the control process implemented as software in the CPU provided to the IPTV illustrated in FIG. 1.

A description is now given of a second embodiment of the control process implemented as software in the CPU 20 referring to a flowchart illustrated in FIG. 3. The CPU 20 starts processing of the flowchart illustrated in FIG. 3 when a program of the television broadcast is selected by a user for the scheduled recording or the scheduled viewing on the EPG displayed as an OSD on the display 14.

When the processing of the flowchart illustrated in FIG. 3 starts, the CPU 20 first obtains program title information of a program of the television broadcast selected by the user for the scheduled recording or the scheduled viewing on the EPG displayed as an OSD on the display 14 (Step S110). In Step S120 subsequent thereto, the CPU 20 searches contents available via the Internet 100 for the same content as the program of the television broadcast which is selected by the user for the scheduled recording or the scheduled viewing on the EPG displayed as an OSD on the display 14.

As a result of the search, if the same content as the program of the television broadcast selected by the user for the scheduled recording or the scheduled viewing on the EPG displayed as an OSD on the display 14 is not detected ("NO" in Step S120), the CPU 20 finishes the processing of the flowchart illustrated in FIG. 3. On the other hand, if the same content as the program of the television broadcast selected by the user for the scheduled recording or the scheduled viewing on the EPG displayed as an OSD on the display 14 is detected ("YES" in Step S120), the CPU 20 proceeds to Step S130.

In Step S130, the CPU 20 obtains the resolution information of the television broadcast selected by the user for the scheduled recording or the scheduled viewing on the EPG displayed as an OSD on the display 14. In Step S140 subsequent thereto, the CPU 20 obtains the resolution information on the content which is the same as the program of the television broadcast selected by the user for the scheduled recording or the scheduled viewing on the EPG displayed as an OSD on the display 14, and is available via the Internet 100 (hereinafter, referred to as Internet content), and compares the resolution of the program of the television broadcast selected by the user for the scheduled recording or the scheduled viewing on the EPG displayed as an OSD on the display 14, and the resolution of the Internet content.

As a result of the comparison, if the resolution of the program of the television broadcast selected by the user for the scheduled recording or the scheduled viewing on the EPG displayed as an OSD on the display 14 is equal to or higher than the resolution of the Internet content ("NO" in Step S140), the CPU 20 finishes the processing of the flowchart illustrated in FIG. 3. On the other hand, if the resolution of the Internet content is higher than the resolution of the program of the television broadcast selected by the user for the scheduled recording or the scheduled viewing on the EPG displayed as an OSD on the display 14 ("YES" in Step S140), the CPU 20 proceeds to Step S150.

In Step S150, the CPU 20 notifies the user, by means of the OSD display, of the fact that the same content having the higher resolution is present on the Internet 100. The OSD display is carried out by transmission of OSD display data from the CPU 20 to the OSD circuit 13. In Step S160 subsequent thereto, the CPU 20 determines whether the user permits switching from the viewing of the television program to the viewing of the Internet content by a key operation on the remote control transmitter (not shown) or the like.

If it is determined as a result that the user does not give permission within a predetermined period ("NO" in Step S160), the CPU 20 finishes the processing of the flowchart illustrated in FIG. 3. On the other hand, if it is determined as a result that the user gives permission ("YES" in Step S160), the CPU 20 switches the content of the scheduled recording or the scheduled viewing from the television program to the Internet content (Step S170), and finishes the processing of the flowchart illustrated in FIG. 3. When the content of the scheduled recording or the scheduled viewing is switched from the television program to the Internet content, the content can be obtained immediately, and it is thus preferred that the recording or the viewing be immediately carried out without scheduling the recording or the viewing. A recording unit for recording a content (such as an optical disk recording/reproducing device or an HDD) may be incorporated into the IPTV according to the embodiment of the present invention illustrated in FIG. 1, or may be externally attached to the IPTV according to the embodiment of the present invention illustrated in FIG. 1. If the recording unit is externally attached to the IPTV according to the embodiment of the present invention illustrated in FIG. 1, the IPTV according to the embodiment of the present invention illustrated in FIG. 1 outputs a scheduled recording instruction signal or a recording instruction signal to the recording unit.

If a content available via the Internet 100 has a high resolution, the content is often not free, and hence some users do not want the switching from the viewing of the television program to the viewing of the Internet content. The processing in Steps S150 and S160 prevents the switching from the viewing of the television program to the viewing of the Internet content against the intention of the user.

Moreover, it is conceivable that a plurality of Internet contents are detected in Step S120. In this case, it is preferred that one Internet content be selected from the plurality of Internet contents in Step S160, and further, in terms of providing information for supporting determination upon the selection, service systems (charge information and the like) of the respective Internet contents be also notified in Step S150.

The embodiments of the present invention have been described above, but the scope of the present invention is not limited thereto, and various modifications can be made to the implementation thereof without departing from the gist of the invention. Examples of the modifications are described below.

Though the above-mentioned embodiments are described for the case of the IPTV of the North American specification, the present invention can be applied to the IPTV for a specification other than the North American specification. Moreover, the present invention can be applied to a content reproduction device (such as a set top box) other than the IPTV as long as it has the television broadcast reception function and the Internet connection function.

Moreover, though the flowcharts illustrated in FIGS. 2 and 3 automatically start at the predetermined timings according to the embodiments mentioned above, the flowcharts illustrated in FIGS. 2 and 3 may be manually started. For example, first and second dedicated keys may be provided on the remote control transmitter (not shown), and the flowchart illustrated in FIG. 2 may be started by the user operating the first dedicated key, while the flowchart illustrated in FIG. 3 may be started by the user operating the second dedicated key.

Moreover, though the IPTV which can receive and reproduce both the analog broadcast and the digital broadcast is described according to the embodiments mentioned above, the present invention can be applied to a content reproduction device which cannot receive and reproduce the analog broadcast.

Moreover, the processing in Steps S50 and S60 and the processing in Steps S150 and S160 may be omitted in the embodiments mentioned above.

Moreover, in Steps S20 and S120, the content title information may be obtained from content title information contained in the control data multiplexed along with the compressed video signal and the compressed audio signal obtained by applying the signal processing to the data of an accessed content, for the contents available via the Internet 100.

Moreover, in Steps S40 and S140, the resolution information may be obtained from resolution information contained in the control data multiplexed along with the compressed video signal and the compressed audio signal obtained by applying the signal processing to the data of an accessed content, for the contents available via the Internet 100.

What is claimed is:

1. A content reproduction device having a television broadcast reception function and an Internet connection function, comprising:

a detection unit for detecting, when a content of a television broadcast is output for reproduction, a content which is the same as the content of the television broadcast and has a resolution higher than a resolution of the content of the television broadcast from among contents available via an Internet; and a reproduction-output switching unit for switching a content of the output for reproduction from the content of the television broadcast to the content detected by the detection unit if the detection by the detection unit is successful.

2. A content reproduction device according to claim 1, wherein the detection unit obtains, for the content of the television broadcast, resolution information from resolution information contained in control data multiplexed along with a compressed video signal and a compressed audio signal obtained by applying signal processing to a received signal of the television broadcast if the content of the television broadcast is a content of a digital broadcast.

3. A content reproduction device according to claim 1, wherein the detection unit obtains, for the content available via the Internet, resolution information from among resolution information contained in control data multiplexed along with a compressed video signal and a compressed audio signal obtained by applying signal processing to data of an accessed content, resolution information contained in metadata independently provided by a service provider, and resolution information stored in advance.

4. A content reproduction device according to claim 1, wherein:

the detection unit obtains, for the content of the television broadcast, program title information from program title information contained in control data multiplexed along with a compressed video signal and a compressed audio signal obtained by applying signal processing to a received signal of the television broadcast if the content of the television broadcast is a content of a digital broadcast;

the detection unit obtains, for the content available via the Internet, content title information from among content title information contained in control data multiplexed along with a compressed video signal and a compressed audio signal obtained by applying signal processing to data of an accessed content, and content title information contained in metadata independently provided by a service provider; and the detection unit determines identity of the contents based on the program title information.

5. A content reproduction device according to claim 1, further comprising a switching permission unit for determining whether to permit the switching of the content of the output for reproduction from the content of the television broadcast to the content detected by the detection unit if the detection by the detection unit is successful, wherein if the switching permission unit does not permit the switching, the reproduction-output switching unit does not switch the content of the output for reproduction even if the detection by the detection unit is successful.

6. A content reproduction device according to claim 2, wherein the detection unit obtains, for the content of the television broadcast, the resolution information from resolution information stored in advance if the content of the television broadcast is a content of an analog broadcast.

7. A content reproduction device according to claim 4, wherein the detection unit obtains, for the content of the television broadcast, the program title information from a program title contained in XDS data multiplexed with the vertical blanking interval of the received signal of the television broadcast if the content of the television broadcast is a content of an analog broadcast.

\* \* \* \* \*